Aug. 18, 1964 T. H. LITTLE 3,145,223
WINTERIZING GLYCERIDE OILS
Filed Sept. 22, 1961 4 Sheets-Sheet 1

INVENTOR.
THOMAS H. LITTLE
BY Dallett Hoopes
ATTORNEY

Aug. 18, 1964   T. H. LITTLE   3,145,223
WINTERIZING GLYCERIDE OILS
Filed Sept. 22, 1961   4 Sheets-Sheet 2
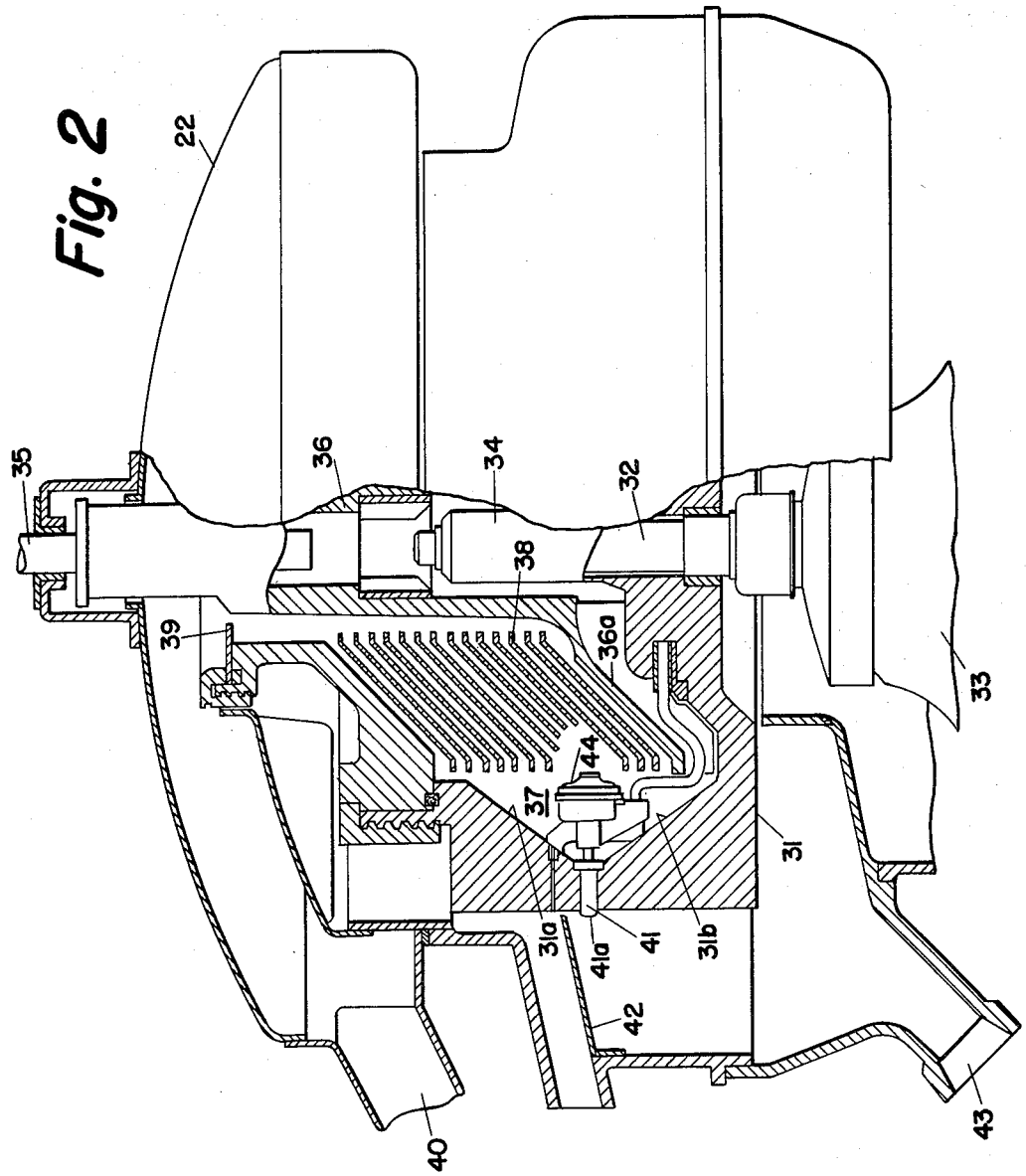
INVENTOR.
THOMAS H. LITTLE
BY Dallett Hoopes
ATTORNEY

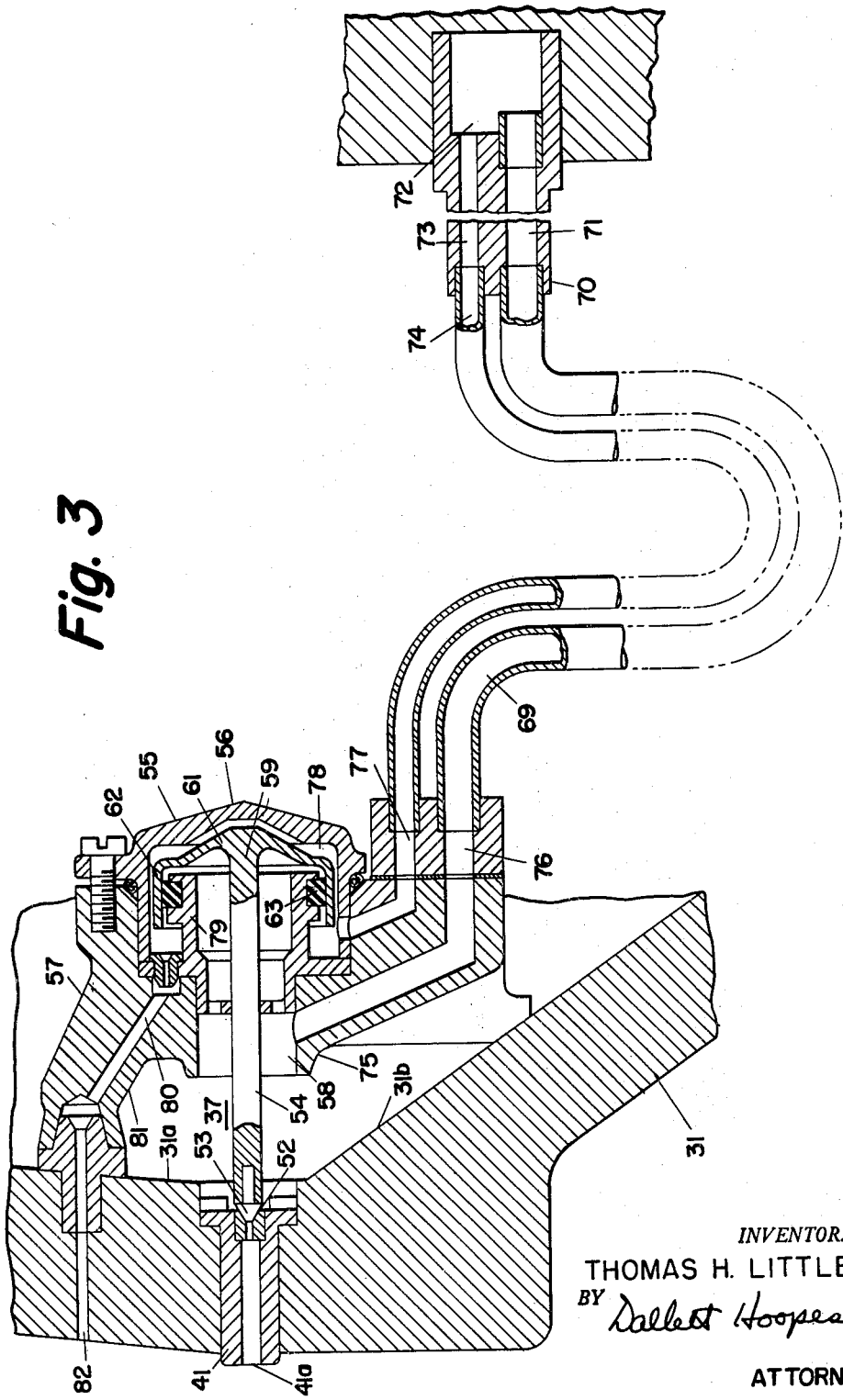

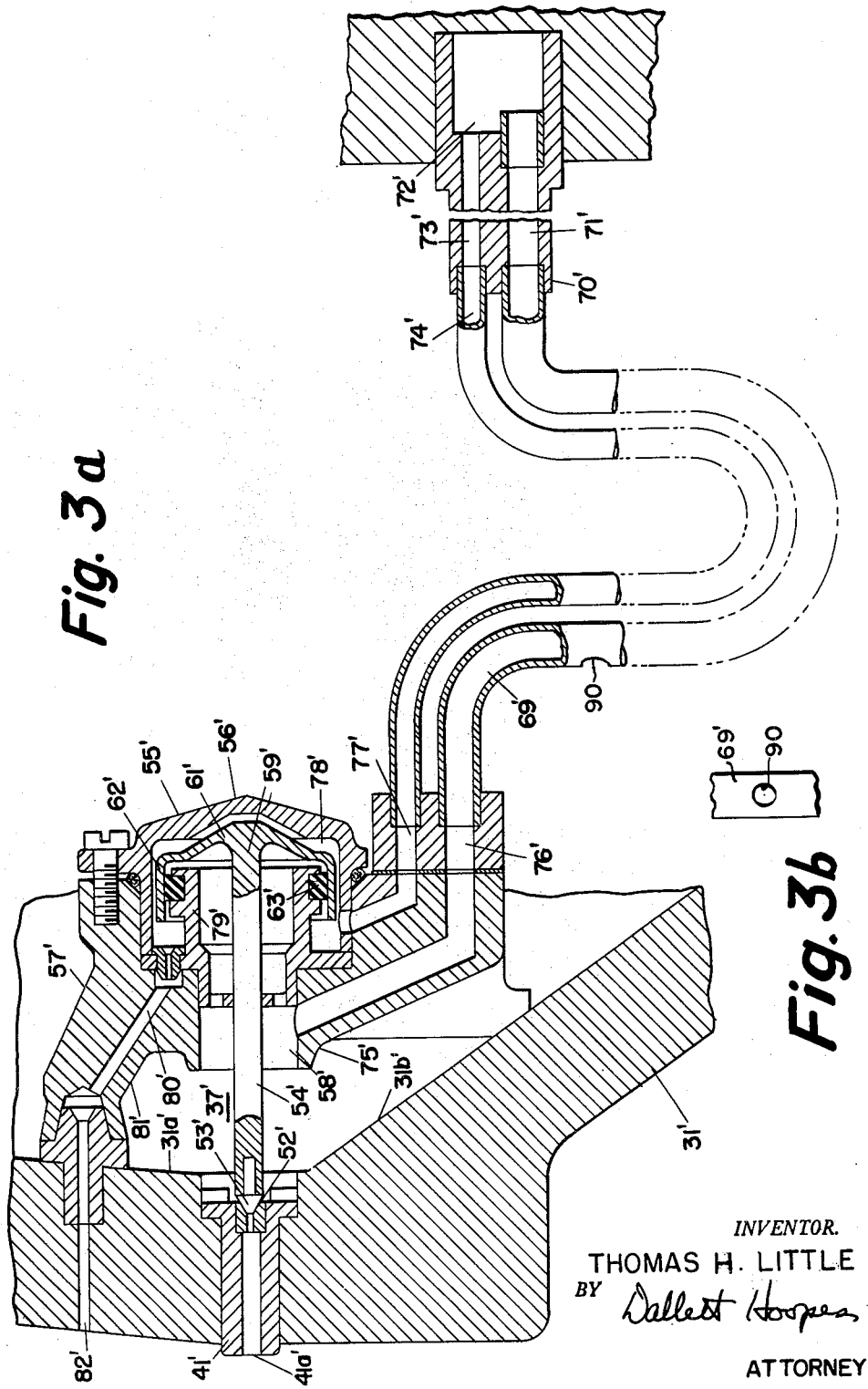

United States Patent Office 3,145,223
Patented Aug. 18, 1964

3,145,223
WINTERIZING GLYCERIDE OILS
Thomas H. Little, Devon, Pa., assignor to Pennsalt Chemicals Corporation, a corporation of Pennsylvania
Filed Sept. 22, 1961, Ser. No. 140,092
6 Claims. (Cl. 260—428)

This invention relates to separating components of glyceride oil by fractional solidification in the absence of solution in a solvent. More specifically, this invention relates to "winterizing" glyceride oils and includes the steps of chilling the oil to crystallize or otherwise solidify a portion of the more saturated glycerides having higher melting points, and removing them by means of centrifugal force.

In the prior art it has been noted that glyceride oils and particularly certain vegetable oils, for instance cottonseed oil, become cloudy when chilled for a period of time to a temperature below about 45° F. This cloudiness has been attributed to the solidifying of some of the higher-melting-point more-saturated glycerides present in the oil. The cloudiness thus produced has reduced the attractiveness of the vegetable oil as a dinner table salad oil, for instance, and the marketplace reaction has demanded its removal.

Heretofore it has been customary to remove the objectionable more saturated glycerides, referred to for convenience as "stearine"; from the oil by a process known in the trade as winterizing. In essence, this process has comprised the steps of gradually lowering the temperature of a batch of oil to about 45° F. or below and maintaining it at that temperature for several days while stearine solids form, grow, and slowly agglomerate. This chilling process has taken 3½ to 5 days. The agglomeration of the solid particles has required absolute stillness of the batch and has been required to enlarge the particles to a size screenable by a conventional filter press. The openings in a conventional filter press would either permit passage of single finite particles or would be blinded thereby.

Winterizing as practiced in the prior art using a filter press has at best been a tedious process. After the patient wait for the growth and agglomeration of the stearine particles, great care has been exercised to assure that the filter press was not blinded by the particles which under excessive pressure such as, for instance 40 pounds per square inch, mold themselves into the openings in the filter bed screen. Periodic shutdown of the apparatus and disassembly of the filter press has been normally necessary to scrape particles off the individual leaves, and for this and general operation requirements, at least two men have been required to run a single 80,000 pound per day machine using the process of the prior art. Perhaps more seriously, time required to agglomerate the particles has limited the output of the expensive winterizing plant, a disadvantage which has been reflected in the price of the winterized oil to the consumer.

Because separating the more saturated glyceride particles from the oil on the basis of specific gravity rather than particle size would, among other benefits, eliminate need for time-consuming agglomeration, attempts have been made in the past to remove the particles from the oil by centrifugal force. Such attempts have usually been made in the conventional centrifuge bowl of the continuous discharge type wherein the heavy phase particles and the lighter phase oil discharge at loci near the axis. In the prior attempts the heavy discharge has usually comprised stearine containing such a quantity of oil as to make the economics of the process unattractive.

I have conceived and perfected a process by which the centrifugal separation of a portion of the more saturated glyceride particles from glyceride oil, for instance cottonseed oil, is practicable. Indeed, in a small fraction of the time required for conventional filter press operation, I have used a centrifuge bowl to separate stearine from chilled cottonseed oil to produce less expensively a product that compares in quality favorably with the more conventionally derived product.

My invention may involve the use of a centrifuge bowl, for instance, of the general type described in the U.S. Patents 2,286,354 and 2,286,355 to Fitzsimmons, which issued June 16, 1942. Such a bowl, normally of the disc stack type may be in the form of a clarifier and is equipped with a peripheral fluid-motor-operated, automatic dumping valve for the heavy discharge. In the use of such a bowl in my winterizing process, the heavier stearine particles collect about the periphery, accumulating to a predetermined depth inwardly of the bowl. As they accumulate in depth especially to the degree permitted by the bowl as I have modified it, the pressure on the outer solids by the more inward particles develops a compression under which the individual plastic solids press tightly against each other, their surfaces and shapes yielding to pack tightly and displacing inwardly of the bowl the entrained and occluded oil. This establishes about the periphery of the bowl a band of stearine solids essentially denuded of oil.

Accumulation of the denuded particles to the predetermined stearine level actuates the fluid-motor-operated dumping valve to extrude stearine peripherally out of the bowl. After the discharge of some of the stearine, the peripheral valve automatically closes to permit again the step of accumulation.

The use of the Fitzsimmons bowl in the process of winterizing has not been attempted before due to the fact that the mechanic skilled in the art knowing the viscous nature of the stearine has assumed that the valve of the Fitzsimmons bowl would plug or otherwise not operate as desired. Hence it has not been obvious to apply such an apparatus in the process described. Moreover, the viscosity of solvent-free cottonseed oil (130 centipoises at 45° F., for instance), is such that one would not expect that centrifugal separation would be feasible under any circumstances.

Since the invention has been conceived and perfected in connection with winterizing cottonseed oil, it will be described in connection therewith. However, it should be understood that the process has a general versatility in the field of winterizing of glyceride oils. Other vegetable oils such as peanut oil, soybean oil, sunflower seed oil, corn oil and rape seed oil are winterizable by the process. Glyceride oils derived from animal and marine sources may also be winterized, under the process, e.g., fish oils used in coating compositions, such as paints, the purpose being to remove relatively saturated glycerides to improve the drying of the oils to hard, non-tacky films. Examples are sardine oil and pilchard oil. Medicinal oils, such as cod liver oil, are frequently winterized to avoid the production of cloud at low temperatures. The invention may also be utilized on oils synthetically produced as in the case of oils produced by hydrogenation and/or molecular rearrangement.

From the foregoing it can be seen that an object of my invention is to provide a process for winterizing glyceride oils in substantially less time than heretofore required and with greater facility and which produces a product comparing favorably with products of prior processes.

Other objects of my invention will be apparent from the description, including drawings, of the process and the specific parts thereof which follows:

Referring generally to the drawings, FIGURE 1 is a flow sheet diagrammatically illustrating the process embodying my invention;

FIGURE 2 is an elevation partly in section illustrating a centrifuge useful in the process;

FIGURE 3 is a sectional elevation, partly diagrammatic, illustrating a valve and valve operating mechanism;

FIGURE 3a is comparable to FIGURE 3 but shows a modified valve useful in practicing the invention; and FIGURE 3b is a fragmentary view of the modified form showing the opening.

Figure 1:
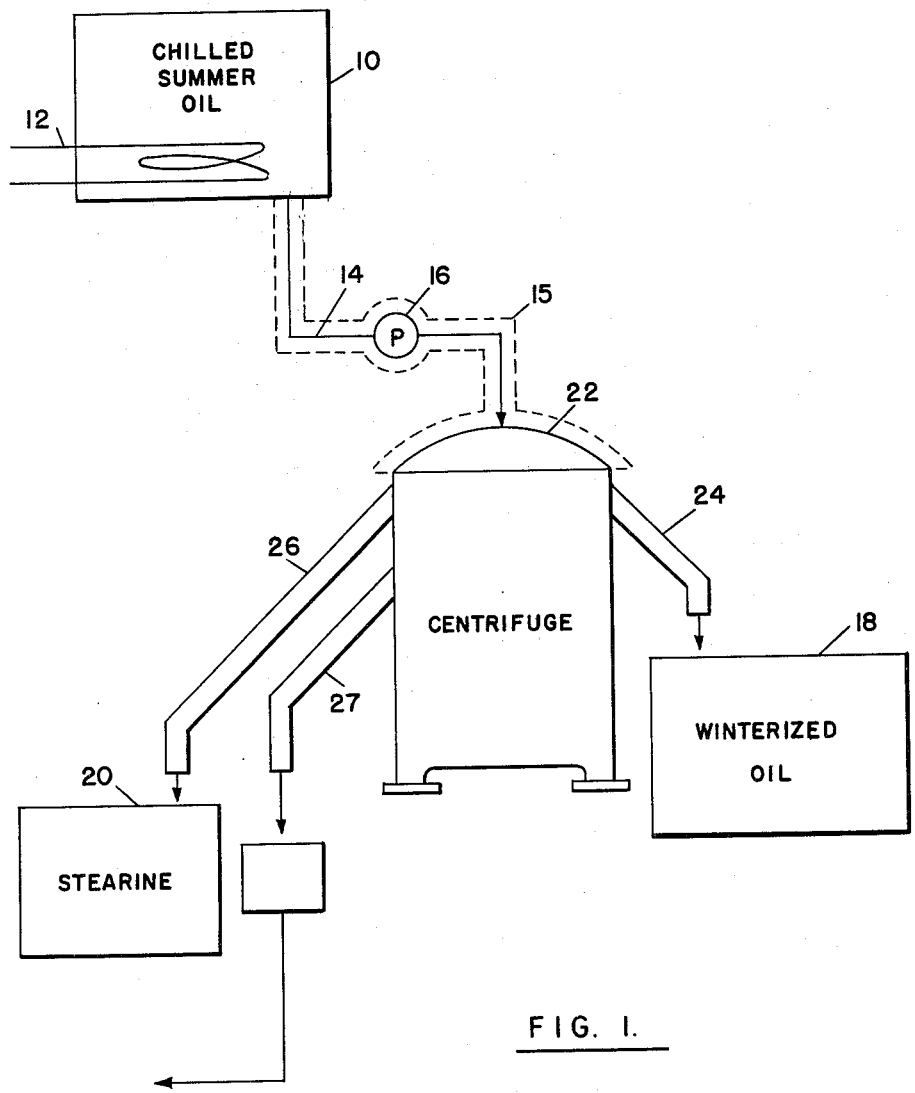

Briefly, the invention involves a process for winterizing a glyceride oil including steps of lowering the temperature of the oil to at least about 50° F. for a period of time to solidify at least a portion of the more-saturated glycerides, subjecting the oil containing the solids to a zone of centrifuging and permitting the solids, in compression at the periphery of the zone, to accumulate to a predetermined depth, and then permitting extrusion outward peripherally of the zone of at least a portion of the solids.

Referring more specifically to the drawings, unwinterized oil, or summer oil, may be retained in a chilling tank or cell 10 which conveniently holds approximately 60,000 pounds or roughly the contents of a railroad tank car. The summer oil may be the product of any of the well known refining processes, such as the kettle process, the continuous caustic process, the soda ash process, a modified caustic or modified soda ash process, or the ammonia process. A solvent-free oil is preferred. Hence it will be understood that this invention does not require the processing of the oil in the miscella state, and it thereby distinguishes from the winterizing processes which do require for their efficacy a solution of oil in a solvent.

The container or cell 10 is cooled by brine coils 12 monitored through a temperature controller, designed to lower the temperature of the liquid in the cell gradually to a temperature preferably of about 45° F. This may be accomplished during a chilling period lasting from about 24 to about 72 hours.

From the cell 10 a pipe line 14 including a constant displacement feed pump 16 conducts the oil with the solids to the centrifuge 22. As indicated in FIGURE 1 the pipe line 14, pump 16, and cover of the centrifuge 22 are equipped with a heat insulating layer 15 to as closely as possible maintain the reduced temperature of the feed. The line 14 and the cover may be traced in brine.

In the centrifuge 22 the oil is clarified, the clarified product discharging at 24 and conducted to a suitable winter oil storage tank 18.

The stearine discharging periodically in extrusion from the periphery of the centrifuge bowl at 26 is collected and conveyed to a suitable container 20 for further processing. Typically the stearine is melted and used in shortening or the like.

A suitable centrifuge for performing the operation of centrifuge 22 is illustrated in FIGURE 2.

Referring now more particularly to FIGURE 2, centrifuge 22 is illustrated as being of the type described in U.S. Patents 2,286,354 and 2,286,355. The rotor 31 is driven by a shaft 32, mounted for rotation within a support 33, and itself driven by any suitable form of motor, not shown. The rotor 31 is secured to a sleeve 34 which is secured to and rotates with shaft 32.

The mixture of oil and stearine is fed through a feed or inlet pipe 35 and flows downwardly through the space between tube 36 and sleeve 34 and outwardly below the skirt 36a on tube 36. The mass moves into the space or chamber 37 formed by the inclined walls 31a and 31b of the rotor 31. Efficient separation of the oil from the stearine takes place as the oil flows inwardly of the stratifying discs 38, and the solids flow outwardly therefrom. The oil flows upwardly in the space adjacent the periphery of tube 36 and over a ring dam 39 for discharge by way of stationary outlet 40.

The stearine solids present collect in the region of intersection of walls 31a and 31b and are discharged in extrusion through opening 41a of bushing 41, and this discharge mass is deflected downwardly by frusto-conical skirt or ring 42 and is discharged from a chute 43. The deflecting skirt 42 may be supported in any suitable way, and serves to keep the latter discharge separate from the discharge and collection of valve operating oil through opening 82 to be hereinafter described.

Associated with each of a plurality of bushings 41 equally spaced around the periphery of rotor 31, is a valve operating assembly 44. Each assembly 44 and its function will be more particularly described in connection with FIGURE 3.

Referring now more particularly to FIGURE 3, a reciprocating valve member 53 is provided for coaction with each of the valve seats 52 positioned at the inner ends of bushings 41, and each of these valve members 53 is connected to a valve stem 54, which is actuated by means to be described hereinafter for intermittent discharge of deposited stearine through the bushings 41.

Fluid motors 55 operate to move the valves, individual motors being attached to each of the individual valve stems 54. The motors 55 and associated parts are secured within the rotor 31 for rotation therewith. Each of these motors 55 comprises a housing which consists of an end portion 56 and a base portion 57 to which the end portion 56 is secured. This housing surrounds the moving parts of the fluid motor. The base portion 57 has an annular extension 58 which lies adjacent but is suitably spaced from the juncture of walls 31a and 31b. The inner end 59 of the valve stem 54 is attached to piston 61 which is the moving member of the fluid motor 55.

The housing base 57 is provided with a lateral extension 75 through which liquid is passed from the main body of the rotor 31 for actuating the fluid motor.

A bore 76 in extension 75 communicates with the space 37 through the passage provided by the annular flange 58. The bore 76 is in turn connected with a conduit 69 which extends downwardly and inwardly around the lower end of the stack of discs 38 and skirt 36a. The inner end of conduit 69 is connected to a member 70 which has a bore 71 communicating with the conduit 69, and also a channel 72 communicating with the inner end of bore 71. A bore 73 extends outwardly from the channel 72, and is connected to a second conduit 74 which extends outwardly from the member 70 to a connection with a bore 77 in the lateral extension 75 of the housing base 57.

The bore 77 communicates with the space 78 between the inside of portion 56 of the housing and the outer surface of the piston 61 of the fluid motor 55. The inner surface of piston 61 communicates with the space 37 of the rotor through the hollow interior of the member 79 of the fluid motor, which is a stationary member having a cylindrical outer surface along which the flange 62 of piston 61 reciprocates, rubber ring 63 acting as a seal. The space 78 is also in communication through an orifice connecting this space with a bore 80 in an extension 81 of the base portion 57 of the motor housing, with an outlet 82 in the rotor wall through which motor actuating fluid is discharged from the machine. It will be noted that material discharged through the outlet 82 is discharged at a separate point from the mass discharged through the bushing 41, and this material is collected separately from said last-mentioned mass.

As centrifuge 22 is brought up to speed, valve member 53 is forced against valve seat 52 under the influence of centrifugal force on valve stem 54 and piston 61. Upon the feed of the mixture from tank 10 to centrifuge 22, the rotor begins to fill, and separation into phases starts to take place. Although during the start-up period the separation into phases is incomplete, the oil layer is quite fluid, and as it enters the extension 58 about valve stem 54, it eventually brings pressure to bear on the inside of piston 61 to move valve member 53 from seat 52. This opening of the valve during start-up, however, is only temporary, for as the body of feed mixture in the rotor becomes deeper, oil enters bore 76, conduit 69 and bore 71, overflowing the radially inward end of the latter (since ring dam 39 is nearer the axis of rotation), whereupon it enters bore 73, tube 74, bore 77 and space 78. The pressure on the oil due to centrifugal force causes the piston 61 to move radially outward to bring valve member 53 back into engagement with valve seat 52. This is assisted by the centrifugal force on piston 61 and valve stem 54. Although oil escapes from space 78 through outlet 82, the flow entering bore 76 and leaving bore 77 is sufficient to offset this leakage, thus keeping the valve closed. The rotor is now in full operation and clarified oil is discharged from the rotor over ring dam 39.

The layer of stearine builds up radially inwardly in this order at the juncture of walls 31a and 31b, and it eventually enters extension 58 and builds up therein. This prevents oil from entering bore 76, and the resistance to flow of oil is such that the rate of leakage at outlet 82 exceeds the rate of flow (if any) of oil into bore 76, with the result that the hydrostatic pressure brought to bear on the interior of piston 61 becomes greater than the sum of the hydrostatic pressure on the outside of piston 61 plus the centrifugal force generated on the piston 61 itself and valve stem 54, with the result that piston 61 and valve stem 54 move radially inward to open the valve.

The stearine, highly viscous, extrudes out through opening 41a. As stearine recedes radially outward from extension 58, oil again enters bore 76 and is again delivered to space 78 to again cause piston 61 and valve stem 54 to move radially outward to close the valve. This cycle of operations is automatically repeated each time stearine enters extension 58 to a sufficient extent to reduce or stop flow into bore 76.

As a result stearine is continuously separated from the oil, and is intermittently and automatically discharged in extrusion from the periphery of the centrifuge 22 through bushings 41. The oil in highly clarified condition is delivered from the centrifuge at 40 after overflowing ring dam 39.

Any other suitable construction and arrangement for the peripheral discharge of the stearine solids separated from the oil may be substituted for the centrifuge shown in FIGURES 2 and 3, which had been described in detail to better describe the mode of operation of the new process. It should be understood, however, that the construction shown in FIGURES 2 and 3, among other reasons because it retains the solids up to a certain level and then discharges them automatically, is a preferred construction. By means of the structure shown in FIGURES 2 and 3 the solids remain in the bowl and compress themselves to displace inward the oil they tend otherwise to occlude or entrain. There will be for each valve cycle a compression of the solids and a consequent inward displacement of the entrained oil. Moreover, this compression or compaction, will be exercised substantially uniformly, cycle after cycle, irrespective of the speed with which the solids accumulate adjacent the walls 31a and 31b thanks to the automatic operation of the valve.

In order not to discharge peripherally the entire contents of the bowl through the bore 41a before closing the valve, bore 41a must be small in diameter. Fluid pressures in this zone of the bowl which may be on the order of 1500 pounds per square inch, require that the bore 41a be for instance .03 to .06 inch in diameter at its narrowest portion. Typically it is .043 inch. A surprising feature of the process according to this invention is that despite the highly viscous nature of the stearine solids, they pass, without clogging, through this narrow bore. It will be understood that consequently the viscous solids will issue intermittently from the bore 41c in the form of a plastic extrusion rather than a stream or spray.

An obvious additional benefit of the application of the Fitzsimmons bowl to the winterizing process is that the solids are discharged periodically at intervals determined in frequency by their presence in the oil; there is no set periodic discharge which might result in the concurrent discharge of oil through the peripheral opening 41a should solids accumulate slowly. Similarly, there is no possibility of solids building up so rapidly that they overflow the dam 39 with the oil before peripheral discharge is permitted.

The valve operating oil discharged through outlet 82 in FIGURE 3 is shown in FIGURE 1 as discharged at 27 and is normally collected separately.

A preferred modified form of the apparatus disclosed in the Fitzsimmons patent is shown in FIGURES 3a and 3b. In the FIGURES 3a and 3b embodiment the primed form of the same reference numeral is used to designate parts corresponding to parts of the FIGURE 3 embodiment.

In this modification an opening 90 is made in a desired position in the conduit 69'. As shown, liquid is free to pass through the opening 90 despite the buildup of solids across the extension 58'. At such time as the solids do build up inward to cover opening 90, oil flow to chamber 78' will be cut off and the valve will open to permit outward extrusion of the outermost, more-compressed and hence more-deoiled portion of solids. When the solids have discharged to uncover opening 90, the valve will close again to permit reaccumulation, etc. As with the FIGURE 3 embodiment, it is only the outermost portion of the solids which discharges at each cycle.

By means of the modified structure disclosed in FIGURE 3a, the predetermined depth of solids at which solid discharge is initiated may be easily varied by changing the position of opening 90 in the tube 69'. Preferably in the winterizing application the opening 90 will be positioned so that the solids accumulate inward to a position immediately outside the disc stack 38. Accumulation to this extent will permit considerably greater compaction and deoiling of the stearine than the FIGURE 3 embodiment.

The following examples of a process embodying my invention are given by way of illustration and are significant for their indication of the practicability of winterizing in accordance with my development.

*Example 1*

Into a cell approximately 18½ feet long, 10 feet wide, 6.7 feet deep is introduced approximately 60,000 pounds of summer cottonseed oil. The oil may be, for instance, refined by a modified soda ash refining process from oil derived from meats of cottonseed grown in the Southeastern United States. Refrigerated brine is pumped through a continuous coil 12 adjacent the bottom wall of the cell and the temperature is gradually lowered to about 45° F. and is held at that temperature. To promote heat transfer a stream of air emanating from a submerged air tube gently agitates the oil for the first 24 hours at the end of which period a cloud of stearine appears. The temperature at this point is approximately 50° F.

From this temperature the chilling is continued and the temperature very gradually lowered to 45° F. 24 hours later. The mixture of oil and stearine is conducted from the cell to a centrifuge of the type described in FIGURE 3a. In the bowl used, the edge of the opening 90 closest to the axis is spaced from the axis a radius slightly less than ⅘ the greatest radius of the inside of the bowl. In other words the opening is located slightly more than ⅕ the distance from the periphery of the zone to the axis. This placement permits inward accumulation of solids to a level slightly outside the disc stack. The bowl operates at 6250 r.p.m. and has an inside diameter of about 18 inches at its widest point. After separation clarified oil is collected from its discharge over the dam 39' in the bowl and is conducted to a suitable container 18 nearby.

The viscous plastic mass comprised predominantly of solids having some oil in admixture extrudes through the peripheral automatically operated openings 41a in the bowl and is collected in a suitable container 20.

The valve-operating liquid which discharges through passage 82' is collected separately.

After an appropriate period of operation, readings and values are taken. Later readings and values at similar points are taken; the table below indicates the results.

| Elapsed time after commencing to centrifuge | Feed rate, p.p.h. | Iodine value, Clarified oil | Iodine value, Stearine |
|---|---|---|---|
| 6 hrs | 4,500 | 112.9 | 93.0 |
| 12 hrs | 4,500 | 112.6 | 93.0 |

The discharged oil in each instance shows a cold test of 10.5 hours. The discharge stearine is found by weight to comprise about 15.7% of the feed mixture.

*Example 2*

Using the same cell described in connection with Example 1 and summer oil from the same source which may be considered for practical purposes uniform, summer oil is winterized using the conventional filter press process. In the first 36 hours the temperature is gradually brought down to 50° F. During the first 24 hours the liquid is gently agitated by an air stream to promote heat transfer. Thereafter, in order that the solids may form, grow and slowly agglomerate, absolute stillness is required. Total chilling requires 5 days' time. By means of a constant displacement pump the mixture is then carefully transferred to a line leading to a filter press including a frame holding 108 plates three feet square comprising a filter area of 1944 square feet. Clarified oil passes through the plates and stearine gradually accumulates on the filter media surface.

The table below, comparable to the table of Example 1, indicates the results.

| Elapsed time after commencing to filter | Feed rate | Iodine value, Oil | Iodine value, Stearine |
|---|---|---|---|
| 6 hrs | 4,500 | 112.4 | 94.5 |
| 12 hrs | 4,500 | 112.4 | 94.5 |

The clarified oil shows a cold test of 10 hours.

Referring again to my process, while temperatures of about 45° F. have been generally indicated throughout, it should be understood that the processing temperature depends on the circumstances, and a range between about 50° F. and about 35° F. is used. Preferably the range is between about 47° F. and about 40° F.

The process may be a continuous one wherein from a continuous source of summer oil a continuously flowing stream of oil is chilled to the desired temperature and delivered to the centrifuge. The more conventional filter press processing has precluded such continuous processing because it has required stillness of the oil for necessary solid agglomeration as noted above.

While a solvent-free oil is preferred for my process, as solvent is not necessary for an effective separation, up to, for instance, 10% solvent may be employed in the process if desired for any reason, maintaining most of the benefits of the invention. An obvious disadvantage of the presence of solvent in the oil during the winterizing process is its additional expense, and also is must be recognized that the need to subsequently strip the solvent requires additional equipment and labor. Moreover, increase of volume of liquid due to the presence of solvent involves greater expense in conveying, chilling, etc.

The centrifuge bowl may have means other than those described for determining the accumulation of solids.

Timing means as disclosed, for instance, in the U.S. Patent 2,723,799 to L. P. Sharples, or photoelectric means or resistivity measuring means disposed in the clarified oil discharge line may be used to trigger peripheral valve dumping, and many of the benefits of the invention will still be retained.

It will be noted that the timer means disclosed in the above-mentioned L. P. Sharples patent may be adjusted to increase or decrease the frequency of the operation of the dumping valve. This adjustment may be accomplished manually by an operator who may adjust in accordance with the clarity of the oil discharge. Alternatively, the adjustment may be made by automatic photoelectric means sensing the clarity of the oil discharge. It should be understood that some stearine can ordinarily be tolerated in the oil discharge since the winterizing is accomplished usually at temperatures lower than those to which the oil is normally exposed, and at the temperature of normal exposure, the small amount of stearine will either be melted or not be noticed.

While the invention has been more particularly described using the term "more-saturated glycerides," in defining the solid or semi-solid substances removed from glyceride oils in practicing what is generally known as winterizing, it is to be understood that the critical distinction is more readily associated with difference in melting point so that what is being extruded through the periphery of the centrifuge bowl can also be identified simply by the term "higher-melting substances." It follows that my new process is applicable to the separation of higher melting substances from other liquid mixtures subsequent to the treatment thereof by cooling to cause the separation in the mixture by solidification to a plastic consistency of such higher melting substances. For example, the process may be applied to oils from other sources such as the hydrocarbon oils; e.g., petroleum lubricating oils.

It is to be understood that the above particular description is by way of illustration and not of limitation and that changes, omissions, additions, substitutions and/or other modifications may be made without departing from the spirit and scope of the invention. Therefore, it is intended that the patent shall cover by suitable expression in the claims the various features of patentable novelty that reside in the invention.

I claim:

1. The process of winterizing a glyceride oil in the absence of solution in a solvent including the steps of
    (a) lowering the temperature of the oil to a temperature within the range of about 50° F. to about 35° F. to solidify at least a portion of the higher-melting glycerides,
    (b) continuously introducing a stream of the chilled oil and solids to a zone of centrifugation,
    (c) building up the solids to a pre-established depth of at least ⅓ of the distance from the periphery of the zone to the axis at which depth the solids obstruct the entrance of a passage in the zone blocking the supply of oil to a segregated chamber, the chamber having a leak passage outward to the outside of the zone and the chamber and the zone having a common partition facing the outside of the zone and movable radially of the zone and carrying a valving surface normally closing an opening in the periphery of the zone, the blocking of supply of oil to the segregated chamber causing a pressure drop in the chamber to move the partition and valving surface inward exposing the peripheral opening,
    (d) extruding a portion of the built-up solids out of the zone through the opening to reduce the depth of solids accumulated thereby unobstructing the entrance and restoring supply of oil to the segregated chamber to cause a pressure increase in the chamber, the partition and valving surface moving outward under centrifugal force to close the peripheral opening to stop the extruding of solids, (e) continually repeating the building up and extruding steps and (f) continuously discharging winterized oil separated from the solids from a locus spaced inward from the periphery of the zone and spaced along the axis from the point of extrusion of solids, and whereby in building up to the pre-established depth the solids are compacted to displace inwardly of the zone entrained and occluded portions of the oil.

2. The process of claim 1 wherein the oil is one of a group of oils consisting of cottonseed oil and peanut oil.

3. The process of claim 1 wherein the temperature range is between about 47° F. and about 40° F.

4. The process of claim 1 wherein the chilling is accomplished as the oil moves in a continuous stream toward the zone of centrifugation.

5. The process of winterizing a glyceride oil in the absence of solution in a solvent including the steps of (a) lowering the temperature of the oil to a temperature within the range of about 50° F. to about 35° F. to solidify at least a portion of the higher-melting glycerides, (b) continuously introducing a stream of the chilled oil and solids to a zone of centrifugation, (c) building up the solids to a pre-established depth of at least ⅓ of the distance from the periphery of the zone to the axis at which depth the solids obstruct the entrance of a sensing passage in the zone blocking the movement therethrough to open a peripheral opening in the zone.

(d) extruding a portion of the built-up solids out of the zone through the opening to unobstruct the entrance restoring movement of oil through the sensing passage to close the peripheral opening to stop the extruding of solids, (e) continually repeating the building up and extruding steps and (f) continuously discharging winterized oil separated from the solids from a locus spaced inward from the periphery of the zone and spaced along the axis from the point of extrusion of solids, and whereby in building up to the pre-established depth the solids are compacted to displace inwardly of the zone entrained and occluded portions of the oil.

6. The process of winterizing a glyceride oil in the absence of solution in a solvent including the steps of (a) lowering the temperature of the oil to a temperature within the range of about 50° F. to about 35° F. to solidify at least a portion of the higher-melting glycerides, (b) continuously introducing a stream of the chilled oil and solids to a zone of centrifugation, (c) building up the solids to a pre-established level located at least ⅓ of the distance from the periphery of the zone to the axis, (d) sensing the solids at the level and making a peripheral opening in the zone, (e) extruding only a portion of the built-up solids out of the zone through the opening and closing the opening, (f) continually repeating the building up, sensing and extruding steps and (g) continuously discharging winterized oil separated from the solids from a locus spaced inward from the periphery of the zone and spaced along the axis from the point of extrusion of solids, and whereby in building up to the pre-established level the solids are compacted to displace inwardly of the zone entrained and occluded portions of the oil.

References Cited in the file of this patent

UNITED STATES PATENTS

| | | |
|---|---|---|
| 2,205,381 | Eckey et al. | June 25, 1940 |
| 2,286,354 | Fitzsimmons | June 16, 1942 |
| 2,286,355 | Fitzsimmons | June 16, 1942 |
| 2,425,001 | Parkin et al. | Aug. 5, 1947 |
| 2,435,626 | Gooding et al. | Feb. 10, 1948 |
| 2,610,915 | Matill | Sept. 16, 1952 |